United States Patent [19]

Ubbelohde

[11] 4,213,956
[45] Jul. 22, 1980

[54] GRANITE COMPOSITION

[76] Inventor: Alfred R. J. P. Ubbelohde, Platts Farm, Font Ridge Lane, Burwash, East Sussex, England

[21] Appl. No.: 961,024

[22] Filed: Nov. 15, 1978

[51] Int. Cl.$^2$ ............................................. C01B 31/04
[52] U.S. Cl. ............................... 423/448; 106/281 R; 264/29.1; 423/449
[58] Field of Search ............... 423/448, 445, 449; 264/29.1, 29.5; 106/281 R

[56] References Cited

U.S. PATENT DOCUMENTS

| | | | |
|---|---|---|---|
| 3,107,153 | 10/1963 | Boquist | 423/448 |
| 3,171,816 | 3/1965 | Peter et al. | 264/29.1 X |
| 3,496,256 | 2/1970 | Boquist | 264/29.1 |
| 3,658,476 | 4/1972 | Trask | 264/29.1 |
| 3,798,161 | 3/1974 | Hamner et al. | 423/448 X |
| 4,012,476 | 3/1977 | Mizuma et al. | 264/29.1 |

FOREIGN PATENT DOCUMENTS 1139914  1/1969  United Kingdom .................... 423/448

*Primary Examiner*—Edward J. Meros
*Attorney, Agent, or Firm*—Wenderoth, Lind & Ponack

[57] ABSTRACT

A method for the production of well-oriented carbon composites is described. The method involves applying shear or shear and compression forces to a composition containing graphite crystallites in a two-component viscous or patsy matrix, one matrix component being carbonizable to yield a high proportion of volatile products and a low proportion of carbonaceous char, the other matrix component being carbonizable to yield a low proportion of volatile products and a high proportion of carbonaceous char including meso phase carbon. The composite can be carbonized, optionally with an intermediate compression step, and may be graphitized. The products can be used in the manufacture of crucibles, containers, thermocouples and synthetic metals.

21 Claims, No Drawings

GRANITE COMPOSITION

This invention relates to improvements in graphite compositions and in particular to a method of producing graphite compositions of high and controlled density in which the graphite crystallites are well-oriented so as to exhibit a high degree of parallelism of their c-axes.

Well-oriented graphite which exhibits a high degree of parallelism has in the past been produced by high temperature pyrolysis of carbonaceous material upon a solid surface maintained at a temperature of about 600° C. to 2400° C. Products obtained in this way, the so-called pyrolytic graphite, do contain a well-oriented graphite exhibiting a high degree of parallelism but the process is too expensive to be used for the production in bulk of commercially useful materials. Furthermore, when using the aforementioned process it is difficult to produce graphite materials having complex shapes and the materials which are produced are difficult to work, e.g. by machining.

In my British Patent Specification No. 1 139 914 I have described a method for the production of well-oriented graphite compositions which method comprises forming a dispersion of graphite crystallites in a viscous pasty or plastic medium and subjecting the dispersion to the action of a shear force alone, or a combination of a shear force with a compressive force, so as to cause substantial reorientation and increase in the parallelism of the crystallites and to cause breakdown of lumps or clusters of crystallites. Suitable viscous party or plastic media may be provided by thermoplastic organic polymers and the shear effect may be produced by passing the dispersion between heated rollers, or extruding it through a die, or by subjecting it to a tensile pull. In a further optional step in the aforementioned method the plastic or pasty medium may be decomposed and carbonised by heating the dispersion containing the well-oriented graphite crystallites to an elevated temperature, e.g. at a temperature up to 800° C., to produce a product comprising well-oriented graphite crystallites in a carbonaceous matrix. The carbonaceous matrix may be non-graphite or at least partially graphitic depending on the nature of the viscous pasty or plastic medium and on the carbonisation temperature used.

Although the method described in the aforementioned British Patent Specification may be used to produce complex workable shapes and does result in the production of a product in which the graphite crystallites have a high degree of orientation, and thus a high degree of anisotropy, neither the degree of orientation of the graphite crystallites in the product, nor the density of the product, which is itself partly dependent upon the degree of orientation of the graphite crystallites, is as great as may be desired.

I now provide a modification of the method described in the aforementioned British Patent Specification by which products may be produced having an improved degree of orientation of the graphite crystallites, an improved anisotropy and a greater density, and in which the processing of the dispersion of graphite may be easier than is the case with the dispersion described in the aforementioned specification.

According to the present invention there is provided a method for the production of well-oriented graphite compositions which method comprises subjecting a dispersion of graphite crystallites in a matrix material to the action of a shear force alone or in combination with a compressive force, the matrix material being in a viscous pasty or plastic form at the temperature at which the shear force is applied and including a component A which is carbonisable to yield a substantial proportion of volatile products and leaving in the composition a relatively low proportion of a carbonaceous char and a component B which is carbonisable to yield a low proportion of volatile products and leaving in the composition a relatively high proportion of a carbonaceous char which includes a substantial proportion of carbon in the form of meso phase.

By carbon in the form of the meso phase we mean the "liquid crystal" or plastic states of chars, such as are formed on progressive decomposition by heating of certain classes only of organic compounds. These states are termed meso phase (which means intermediate) to mark the fact that on still further heating they consolidate into non-plastic carbons. Meso phase plastic chars are described, e.g. by J D Brooks and G H Taylor in 1968 Vol. 4, p. 243 of *Chemistry and Physics of Carbon*, Ed. Philip I, Walker (Arnold, New York) and their definition has been extensively discussed, e.g. by H Marsh in 1976 (Proceedings-4th London International Conference on Carbon and Graphite, Society of Chemical Industry (London)). The method of the present invention is an improvement over that described in the aforementioned British Patent Specification as the composition containing well-oriented graphite which is produced by the method may subsequently be treated to produce products having an improved degree of orientation of the graphite crystallites and a greater anisotropy and density than may the compositions produced by the method described in the aforementioned specification. The ability to produce improved products is believed to be a function of the nature of the matrix material in the graphite dispersion used in the method. Thus, carbonisation of the composition gives a product containing graphite crystallites dispersed in a carbonaceous matrix, the matrix comprising a large proportion of pores or voids caused by volatilisation of a substantial proportion of component A and also comprising a proportion of mesophase carbon and any undecomposed residues derived from component B, the meso phase carbon being capable of being rendered plastic at elevated temperature. The pores left after volatilisation are themselves parallelised. Thus, by subjecting the carbonised product to an elevated pressure and temperature it is possible to compress it by expelling the pores or voids and by compressing the plastic meso phase carbon with the result that an improvement in the orientation of the graphite crystallites and in the anisotropy and density of the carbonised product may be obtained. The parallelism of the pores enables such compression, to remove the pores, of the partially carbonised composition containing meso phase carbon to be carried out under substantially less extreme conditions of pressure and temperature than are necessary with conventional graphites where the pores are oriented at random. Further the fact that, in the present invention, the pores are well oriented (parallelised) means that higher degrees of parallelism i.e. anisotropy can be achieved in the final product.

The components A and B are preferably compatible with each other so as to form a homogeneous mixture. The components A and B may be mixed by conventional means. For example, particulate forms of the components may be mixed in a suitable blender or when the components are polymeric materials they may be mixed and blended on rollers, e.g. on a pair of contra-rotating rollers. Alternatively, the mixing may be effected by dissolving the components in a common solvent and precipitating the components from the solvent.

Dispersion of the graphite in the matrix material may suitably be effected in a ball-mill or on a pair of contra-rotating rollers.

Application of the shear force to the dispersion should be effected at a temperature at which the matrix material is in a viscous pasty or plastic form which allows breakdown of clumps or clusters of graphite crystallites and permits relative slip between the graphite crystallites to take place under the force applied while still being able to retain the graphite crystallites in the same relative position when the shear forces are removed. The matrix material must also be thermally stable at the temperature at which the shear forces are applied and in particular this latter temperature should not be so high that rapid charring or decomposition of the matrix takes place so that the lubricating effect of the material is lost.

It is preferred that component A flows and has a suitable viscosity at a temperature which is lower than that at which component B flows and has a suitable viscosity with the result that the processing of the dispersion is somewhat easier than is the case with the dispersions described in British Patent Specification No. 1 139 914. Whilst the mixture of components A and B must be in a viscous pasty or plastic form at the temperature at which the shear force is applied it is preferred that both of the components A and B are solid at room temperature so that when the shear forces are removed and the dispersion is cooled from the processing temperature the graphite crystallites in the composition are held in the same relative positions. Component A suitably flows, and has a relatively low viscosity, when heated at a temperature of up to 150° C. and component B suitably flows when heated at a temperature above 150° C., e.g. above 200° C. and a suitable temperature at which to apply the shear forces to the dispersion is in the range 200° C. to 350° C.

The composition produced by the application of a shear force is ordinarily obtainable in thin sheets. A number of thin sheets can generally be superimposed one upon the other and can be united into a thicker sheet by the effect of heat and pressure. For example, flat sheets of the composition may be united at 200° C. under a pressure of 300 lb/sq inch or greater. The composition may also be shaped or reshaped into shapes other than that of a sheet, for example, bowls, crucibles, rods or tubes, without loss in the degree of orientation of the graphite crystallites.

Various methods may be employed for subjecting the graphite dispersion to shear forces or to combined heat and compressive forces, one method being to pass the dispersion between two heated rollers or to irradiate the dispersion with radiant heat before passing it through the nip of two rollers, whilst another method is to subject the dispersion to the action of milling on heated rolls, for example, rolls of the type used in the rubber industry. It is also found that well-oriented compositions are also obtainable by extruding the dispersion through a die so designed as to bring about the desired degree of shear and compression.

When producing sheets of well oriented graphite compositions it is found to be particularly desirable to subject the material to a rolling action in two or more directions, for example in two directions at 90° to one another. If this rolling is carried out in such a way as to achieve at least a 50% increase in length then it is found that the high shear exerted upon the material brings about a greater orientation of the crystallites and that few if any clumps or clusters of graphite crystallites survive. The bonding together of plurality of sheets or other shapes containing oriented graphite by the application of heat and pressure may be effected after the rolling action has been applied.

It is further found advantageous to enclose the dispersion between thin sheets of material capable of withstanding the temperature of the hot rolling such as a metal, e.g. copper or aluminium of a thickness of about 0.025 to 0.25 mm. e.g. 0.04 mm, or thermally stable polymers or paper since, by so encasing the dispersion the disadvantage that the material might stick to the rollers is obviated. The thin metal or other sheet may readily be stripped from the finished product if desired. Such sheets may, if necessary, be coated with a variety of anti-adhesive materials such as silicones or other materials which facilitate the stripping of the sheets from the graphite-containing composition.

Whilst the graphite crystallites are being oriented in the viscous pasty or plastic state matrix the application of a suitably directed magnetic field can enhance the degree of parallelism obtained. Typically such a magnetic field will be of several kilogauss e.g. up to 10 KG, and in particular about 4KG. The magnetic field should be applied whilst the composition is subject to shear or shear compression forces e.g. during rolling, milling or extrusion.

The method of the present invention may include a further step in which the composition containing the well-oriented graphite is heated to an elevated temperature to carbonise the matrix material.

As described hereinbefore the matrix material comprises at least two components one of which A is carbonisable to yield a substantial proportion of volatile products and leaving in the composition a relatively low proportion of carbonaceous char and the other of which B is carbonisable to yield a low proportion of volatile products and leaving in the composition a relatively high proportion of carbonaceous char containing carbon in the form of meso phase. Thus, heating the composition containing well-oriented graphite to a temperature at which the components of the matrix material are converted to a carbonaceous material results in the production of a material containing well-oriented graphite in a carbonaceous matrix, the matrix comprising a substantial proportion of pores due to the volatilisation of a substantial proportion of the component A during carbonisation, and also comprising a proportion of meso phase carbon derived from component B. An important advantage is that the pores or voids formed by the partial carbonisation of matrix material, especially component A, generally lie between well parallelised crystallites and are thus themselves well parallelised. Relatively large pores or voids may take the form of lamina lying parallel to the surrounding crystallites.

Any major shaping or reshaping of the composition that is to be effected should be carried out before the matrix material is carbonised and the carbonisation temperature used should be sufficiently high to result in carbonisation of the matrix material at a reasonable rate. The precise temperature used will depend on the nature of the components A and B and in particular on the nature of component B. A temperature up to 600° C. or even greater may suitably be used.

In a further step in the method of the present invention the material containing well-oriented graphite in a carbonaceous matrix comprising in part pores and in part meso phase carbon and other residues from component B, may be pressed, for example by application of hydraulic pressure, suitably a pressure in the range 1000 lb/sq in. to 30,000 lb/sq in at a temperature above that at which the meso carbon produced from component B becomes plastic, e.g. at a temperature above 250° C., to collapse or otherwise remove the pores, or at least some of the pores, and to compress the meso phase carbon thereby increasing the degree of orientation of the graphite crystallites. As the graphite crystallites, as well as many of the pores, are already well-oriented application of only moderate pressure suffices to achieve a substantial increase in the density of the composition. As a result of this further step in the method the degree of orientation of the graphite crystallites is greater and the density and anisotropy of the composition is higher than is the case with compositions produced by the process described in British Patent Specification No. 1 139 914.

As is described above in connection with the orientation of the graphite crystallites the application of a magnetic field during compression of the partly carbonised composition containing meso-phase carbon may enhance the degree of orientation of the crystallites in the product.

I discuss above the possibility of having a further compression step to remove the well parallelised pores formed in the composite on initial carbonisation. For some end uses of the product it can be advantageous to retain these well parallelised pores in the composite. This can readily be effected by not carrying out the intermediate compression step on the partly carbonised composite. Thus, a further aspect of my invention provides a method of producing well-oriented graphite compositions according to the invention wherein the carbonisation reaction is carried to completion without compressing the composition at the intermediate stage at which meso-phase carbon is present.

The size of the pores in the product graphite compositions can be controlled by controlling the size of the graphite crystallites or agglomerates thereof used as a starting material. Using relatively large graphite crystallites such as graphite flakes gives correspondingly large pores, and using small crystallites gives small pores. Thus, the size of the pores can be controllably varied according to the crystallite or agglomerate size in the starting graphite, without altering the proportions of graphite and matrix material (component A plus component B) in the composition prior to shearing. This is not possible in conventional graphites because the pores are randomised. The ability to produce well-oriented graphite compositions having pores of controlled size is of particular value where the final product is intended for use in a flow of gases e.g. in chemical reaction vessels e.g. for catalyst support or in nuclear reactors especially where a gaseous coolant is used.

Component A on carbonisation results in the formation of a substantial proportion of pores and it is preferred that this component carbonises to leave not more than 25% by weight of carbon, that is at least 75% by weight of the component is volatilised on carbonisation. More preferably component A carbonises to leave no more than 15% by weight of carbonaceous char.

The temperature at which component A is carbonisable is preferably lower than that at which component B is carbonisable and the difference between the aforementioned temperatures is preferably at least 100° C. Component A suitably carbonises at a temperature above 250° C. Suitable materials which may be used as component A include polystyrene, polyethylene, polypropylene, chlorinated polyethylene, poly (vinyl chloride) and poly (vinyl acetate), cellulose acetate, or mixtures thereof. This list is exemplary but not limiting on the materials which can be used as component A. A wide variety of organic compounds, especially, but not exclusively organic polymers and macromolecular compounds, satisfy the carbonisation requirement for component A. A general reference to carbonisation of organic compounds which will aid the man skilled in the art in the selection of suitable materials other than those specifically listed is the book "Chemistry and Physics of Carbon" by Fitzer, Mueller and Schafer, Volume 7 (1971) published by Marcel Dekker Inc., New York. Pages 237 to 283 are particularly relevant.

Component B is preferably carbonisable at a temperature higher than that at which component A is carbonisable and on carbonisation leaves a high proportion of carbonaceous residue. Component B preferably carbonises to leave at least 50% by weight of carbon and more preferably at least 75% by weight of carbon. The carbonaceous residue should also contain carbon in the form of meso phase. The temperature at which component B is carbonisable is suitably above 350° C., especially above 400° C., and suitable materials for component B which are carbonisable to produce a carbonaceous residue which contains the meso phase of carbon include polyacrylonitrile and copolymers of acrylonitrile, naphthacene, isodibenzanthrone, pyranthrone, indanthrone, dibenzanthronyl, dibenzanthrone, 1,1-dianthrimide, acenaphthylene, chrysene, fluoranthrene and 9,9-bifluorene, polyether sulphones, and tarry extracts from coal.

Suitable polyether sulphones include polymers whose units of structure include aromatic polyether sulphones having the formulae $-(C_6H_4-SO_2-C_6H_4-O)-$ or $-(C_6H_4-C_6H_4-SO_2-C_6H_4-O)-$. The tarry extract from coal may be an extract having a softening point in the range 300° C. to 400° C. and produced by extracting coal with anthracene oil at about 400° C., followed by filtering off the extract and distilling the oil from the filtrate.

In yet a further step in the method of the invention the composition containing well-oriented graphite crystallites in a carbonaceous matrix, after being subjected to pressure to orient yet further the graphite crystallites and increase the density of the composition, may be heated to high temperature e.g. to a temperature of 1000° C. to 2000° C. to more completely graphitise the carbonaceous matrix and improve the electrical properties of the composition.

The meso phase carbons formed from component B are known to graphitise readily and their contact with the well-oriented graphite crystallites originally present also helps to orient the newly graphitised material as well as to bind the crystallites strongly together.

In order to achieve a substantial conversion of the matrix to graphite the carbonisation treatment should take place under either an inert or a reducing atmosphere since any oxygen present during the carbonisation reaction tends to react with the small graphite crystallites in their process of growth bringing about a degree of cross-linking which inhibits extensive graphitisation. For some purposes, cross-linking in the carbonaceous char may actually be desirable and well-oriented graphite crystallites separated by non-graphitic carbon as well as by any well-oriented pores may present a texture preferably to a wholly graphitic structure. To produce such composite materials, the carbonisation treatment is carried out in an oxidising atmosphere or there is used as or as part of the matrix material compounds which are known not to graphitise at temperatures below about 3000° C.

By the process of the present invention it is possible readily to produce almost any desired quantity of well-oriented graphite composition in forms of shapes convenient for further processing or use provided, of course, that the starting material contains crystallites of graphite.

It will be appreciated that prior to use in the method of the present invention the graphite is preferably purified to free it from traces of metal compounds and other impurities by the use of any of the known purification methods. For example, the natural Madagascar graphite (itself composed of a number of assemblies of small platelets of well-oriented graphite) may be ball-milled if required, and purified by extraction with hot hydrochloric acid in a Soxhlet extractor, after which it may be treated with cold hydrofluoric acid and finally traces of metal may then be removed by heating with carbon tetrachloride and dichlorodifluoromethane at temperatures which are progressively raised to a maximum of 2400° C. By this treatment, metal impurities remaining in the graphite are converted into volatile halides and are thereby removed.

The proportions in which the graphite and the matrix material may be used may vary widely, the minimum proportion of the material is, of course, that amount which is required to allow slip to take place between the graphite crystallites. A suitable dispersion contains at least 5% by weight of the material. Larger proportions may be used, for example, a dispersion containing up to 95% by weight of the material. Thus, a suitable dispersion contains from 5 to 95% by weight of graphite. Preferably the dispersion contains 20% to 90% by weight of graphite, more preferably 40% to 80% by weight of graphite.

The proportions of components A and B in the dispersion may also vary over a wide range. However, as it is clearly desirable that the product comprising oriented graphite crystallites in a carbonaceous matrix should contain an amount of meso phase carbon which allows the product to be pressed in a reasonable extent without requiring the use of excessive pressures so as to result in further orientation of the graphite crystallites and increase in the density of the composition it is preferred that the matrix material contains a reasonable amount of the component B from which the meso phase of carbon is produced, and in particular at least 10% of component B by weight of the matrix material. The matrix material may contain up to 90% by weight of component B. A preferred composition of the matrix material is 20 to 80% by weight of component A and correspondingly 80% to 20% by weight of component B. A more preferred composition is 40 to 60% by weight of component A and correspondingly 60% to 40% by weight of component B.

The products obtained by the method of the present invention, even in those forms in which the graphite is dispersed in the medium in its original state, exhibit the anisotropic properties associated with the known well-oriented graphites. In this form as well as in those forms where the medium has been carbonised to graphitic or non-graphitic carbon, the products of this invention are particularly useful in those electrical, electrochemical and thermal applications where their anisotropic properties render them valuable. Thus there may be made graphite containers or crucibles for use at high temperatures in which the transmission of heat through the side walls is reduced very considerably. Another possible use is in the manufacture of synthetic metals, for example as is desired in Comentarii (1972) Vol 2 pp 1 to 2 and in Carbon (1976) Vol 14 pp 1 to 6 in relation to well ordered graphite produced by prior art techniques. Other specific uses, such as the production of thermocouples, will suggest themselves to persons skilled in the art.

The invention is now illustrated by the following Example.

EXAMPLE

A homogeneous mixture was made from 79 parts by weight of purified natural graphite (Foliac, 2.17 g/ml, ash content less than 0.05%), 10 parts by weight of powdered polystyrene (as component A), 10 parts by weight of a polyether sulphone having a repeat unit of the structure $-(C_6H_4-SO_2-C_6H_4-O)-$ (as component B), and 1 part by weight of stearic acid. (Before mixing the polyether sulphone was dried by heating in a circulating oven for 3 hours at a temperature of 150° C.) The mixture was then formed into a sandwich between two sheets of 0.04 mm thick aluminium foil and the sandwich was pressed between plates at a temperature of 250° C. and a pressure of 250 lb/sq in.

The thus formed graphite-containing polymer sandwich was then passed repeatedly through the nip between a pair of contra-rotating chromium plated rollers until the sheet was approximately 0.06 mm thick. The temperature at which the sandwich was passed between the rollers was approximately 400° C., to which temperature the sandwich was heated by means of hot plate and radiant heaters before each pass between the rollers. The rollers were steam heated to a temperature of 140° C. and after each pass between the rollers the sheet was turned through 90° before the next pass between the rollers. A thicker graphite-containing sheet was then formed stacking several sheets and heating the stacked sheets between plates at a temperature of 250° C. and under an applied pressure of 1500 lb/sq in.

In order to carbonise the polystyrene and the polyether sulphone the resultant thicker sheet was then heated in an oven at a temperature of 430° C. and under an atmosphere of nitrogen for a time of 16 hours at which time weight loss of the sheet had ceased. After carbonisation the density of the sheet was 1.6 g/ml.

In order to increase the density of the sheet and increase the alignment of the graphite crystallites the sheet containing the carbonised polymer was compressed by heating it between plates at a temperature of 250° C. and under an applied pressure of 15,000 lb/sq in. The density of the resultant sheet was 2.10 g/ml.

The orientation of the crystallites of graphite in the sheet of density 2.10 g/ml was determined as follows. A sample of dimensions 10×1×1 mm was cut from the sheet and mounted on the Eulerian cradle of an X-ray diffractometer provided with an automatic counter and the position giving maximum diffraction intensity was located. The counter was then locked in the position corresponding to this maximum diffraction intensity and the sample was moved about its longitudinal axis through an angle of 45° in one direction and then through an angle of 45° in the opposite direction and the fraction of the graphite crystallites disposed within a given angle from the direction of maximum intensity was located. The results were plotted in the form of a graph of angular displacement from the position of maximum intensity versus diffraction intensity and the angular width traversed at the position of half of the maximum intensity was noted and taken as a measure of the orientation of the graphite crystallites. In the sheet prepared as described above the angular width traversed at the position of half of the maximum intensity was 6°.

An estimate of the anisotropy of the sheet was also made by measuring the resistivity of the sample in the direction of the maximum X-ray diffraction intensity (the nominal C-axis) and in a direction at right angles to this direction. The respective resistivities were 40 microhm cm in the direction of maximum X-ray diffraction intensity and 0.2 microhm cm in a direction at right angles.

By way of comparison and in order to show the properties of graphite-containing sheets prepared following the procedure described in my British Patent Specification No. 1 139 914 the procedure described above was followed except that the mixture which was initially pressed between aluminium foil comprised 81 parts by weight of graphite, 6 parts by weight of polystyrene, 6 parts by weight of an acrylonitrile/butadiene/styrene copolymer, 6 parts by weight of dioctyl phthalate plasticiser and 1 part by weight of stearic acid, in order to form a thicker sheet the procedure of stacking and heating the stacked sheets under pressure was followed except that a temperature of 200° C. and a pressure of 300 lb/sq in was used, and the non-graphitic material in the sheet was carbonised by heating the sheet in oven under an atmosphere of nitrogen at a temperature of 300° C. for 6 hours after which time weight loss of the sheet had ceased. The density of the sheet was 1.60 g/ml.

The orientation of the graphite crystallites in the sheet was indicated by an angular width of 16° traversed at the position of half of the maximum X-ray intensity, a resistivity of 100 microhm cm in the direction of the maximum X-ray diffraction intensity and a resistivity of 6 microhm cm in a direction at right angles to this direction.

I claim:

1. A method for the production of highly anisotropic and well oriented graphite compositions which method comprises subjecting a dispersion of graphite crystallites in a matrix material to the action of a shear force alone or in combination with a compressive force, the matrix material being in a viscous pasty or plastic form at the temperature at which the shear force is applied and said matrix material including a component A which carbonizes at a temperature above 250° C. to leave not more than 25% by weight of carbon the remainder of component A on carbonization being volatile products and a component B which carbonizes at a temperature above 400° C. to leave at least 50% by weight of carbon in the form of a carbonaceous char comprising meso phase carbon, the difference in carbonization temperatures of said component A and said component B being at least 100° C. and wherein the matrix material comprises from 20 to 80% by weight component A and 80 to 20% by weight component B.

2. A method as claimed in claim 1 wherein component A suitably flows and has a relatively low viscosity when heated at a temperature of up to 150° C. and component B suitably flows when heated at a temperature above 200° C.

3. A method as claimed in claim 1 wherein the shear force is applied to the dispersion at a temperature of from 200° to 350° C.

4. A method as claimed in claim 1 wherein the shear force is applied by rolling and wherein the rolling effects at least a 50% increase in length in the composition.

5. A method as claimed in claim 1 wherein the composition is rolled in at least two directions at 90° to one another.

6. A method as claimed in claim 1 wherein a magnetic field is applied to the composition during application of the shear force.

7. A method as claimed in claim 1 including the further step of heating the composition containing the well-oriented graphite to an elevated temperature to carbonise the matrix material.

8. A method as claimed in claim 7 wherein the carbonization of the matrix material is stopped when substantially all of component A has been carbonized and component B has been carbonized to form meso phase carbon and subjecting the resultant composition to further compression force to collapse pores produced in the composition by the volatilization accompanying the carbonization of component A.

9. A method as claimed in claim 8 wherein the composition is pressurised at a pressure in the range 1000 to 30,000 pounds per square inch at a temperature above that at which the meso carbon produced from component B becomes plastic.

10. A method as claimed in claim 8 wherein the temperature of the further compression is above 250° C.

11. A method as claimed in claim 8 wherein the additional compression is carried out under an applied magnetic field.

12. A method as claimed in claim 7 wherein the composition is completely carbonised without an intermediate compression step.

13. A method as claimed in claim 1 wherein component A is a material, which is carbonisable to yield a substantial proportion of volatile products and a low proportion of a carbonaceous char, selected from the group consisting of polystyrene, polyethylene, polypropylene, chlorinated polyethylene, poly (vinyl chloride) and poly (vinyl acetate), cellulose acetate, and mixtures thereof.

14. A method as claimed in claim 1 wherein component B is a material, which is carbonisable to yield a low proportion of volatile products and a high proportion of a carbonaceous char which includes a substantial proportion of meso-phase carbon, selected from the group consisting of polyacrylonitrile, a copolymer of polyacrylonitrile, naphthacene, isodibenzanthrone, pyranthrone, indanthrone, dibenzanthronyl, dibenzanthrone, 1,1-dianthrimide, acenaphthylene, chrysene, fluoranthrene and 9,9-bifluorene, a polyether sulphone, a tarry extract from coal and mixtures thereof.

15. A method as claimed in claim 7 wherein the carbonised composition containing well-oriented graphite crystallites is subseqently graphitised.

16. A method as claimed in claim 15 wherein the graphitisation is carried out by heating the composition to a temperature of at least 1000° C.

17. A method as claimed in claim 15 wherein the carbonisation and graphitisation are carried out under non-oxidising or reducing atmospheres.

18. A method as claimed in claim 7 wherein the carbonisation is carried out in an oxidising atmosphere or the matrix material contains compounds which do not graphitise at temperatures below 3000° C.

19. A method as claimed in claim 1 wherein the proportion of matrix material in the starting material composition is from 5 to 95% and the proportion of graphite from 95 to 5% by weight.

20. A method as claimed in claim 8 wherein the further pressed composition is heated to complete carbonization thereof.

21. A method for the production of highly anisotropic well-oriented graphite compositions which method comprises subjecting a dispersion of graphite crystallites in a matrix material to the action of a shear force alone or in combination with a compressive force, the matrix material being in a viscous pasty or plastic form at the temperature at which the shear force is applied and said matrix material including a component A selected from the group consisting of polystyrene, polyethylene, polypropylene, chlorinated polyethylene, poly (vinyl chloride), poly (vinyl acetate), cellulose acetate and mixtures thereof and a component B which is carbonizable to yield a carbonaceous char comprising meso phase carbon said component B being selected from the group consisting of polyacrylonitrile, naphthacene, isodibenzanthrone, pyranthrone, indanthrone, dibenzanthronyl, dibenzanthrone, 1,1-dianthrimide, acenaphthylene, chrysene, fluoranthrene, 9,9-bifluorene, a polyether sulphone, a tarry extract from coal and mixtures thereof and wherein the matrix material comprises from 20 to 80% by weight of said component A and 80 to 20% by weight of said component B.

* * * * *